United States Patent
Mooney et al.

Patent Number: 5,907,120
Date of Patent: May 25, 1999

[54] INFLATOR FOR VEHICLE AIR BAGS

[75] Inventors: Thomas R. Mooney; George W. Trahan, both of Palos Verdes; Gaybert B. Little, Jr., Redondo Beach; Robert F. Flagg, Upland, all of Calif.

[73] Assignee: Hi Shear Technology Corporation, Torrance, Calif.

[21] Appl. No.: 08/758,844

[22] Filed: Dec. 2, 1996

Related U.S. Application Data

[63] Continuation-in-part of application No. 08/664,408, Jun. 17, 1996, abandoned.

[51] Int. Cl.[6] .............................. C06D 5/00; B60R 21/28
[52] U.S. Cl. ......................... 102/521; 280/737; 280/741; 222/3
[58] Field of Search .................................... 102/440, 443, 102/530, 531; 280/736, 737, 740, 741, 742; 222/3

[56] References Cited

U.S. PATENT DOCUMENTS

| | | | |
|---|---|---|---|
| 3,810,655 | 5/1974 | Pracher | 280/737 |
| 3,966,226 | 6/1976 | Roth | 280/737 |
| 5,060,973 | 10/1991 | Giovanetti | 280/736 |
| 5,531,473 | 7/1996 | Rink et al. | 280/737 |
| 5,577,769 | 11/1996 | Di Giacomo et al. | 280/736 |
| 5,601,310 | 2/1997 | Di Giacomo et al. | 280/741 |
| 5,602,361 | 2/1997 | Hamilton et al. | 102/530 |
| 5,607,181 | 3/1997 | Richardson et al. | 280/737 |

FOREIGN PATENT DOCUMENTS 2300577  7/1973  Germany ................. 280/742

*Primary Examiner*—Harold J. Tudor
*Attorney, Agent, or Firm*—Donald D. Mon

[57] ABSTRACT

This inflator of this invention includes a casing with a chamber containing an oxidizer gas. An exit port is located at one end of the casing which is closed by a burst disk. An exit tube extends into the chamber from the exit port to provide an orderly path for generated gases to leave the chamber. A fuel cell holding a liquid fuel is located at another end of the casing. A piston is driven in the fuel cell by gases from an igniter to drive the liquid fuel into the chamber. An igniter channel interconnects a region containing hot gases from the igniter to a region in the chamber where the liquid fuel and the oxidizer gas are mixed together. An injector tube conveys the fuel from a discharge end of the liquid fuel cell to a combustion region adjacent the igniter channel.

27 Claims, 4 Drawing Sheets

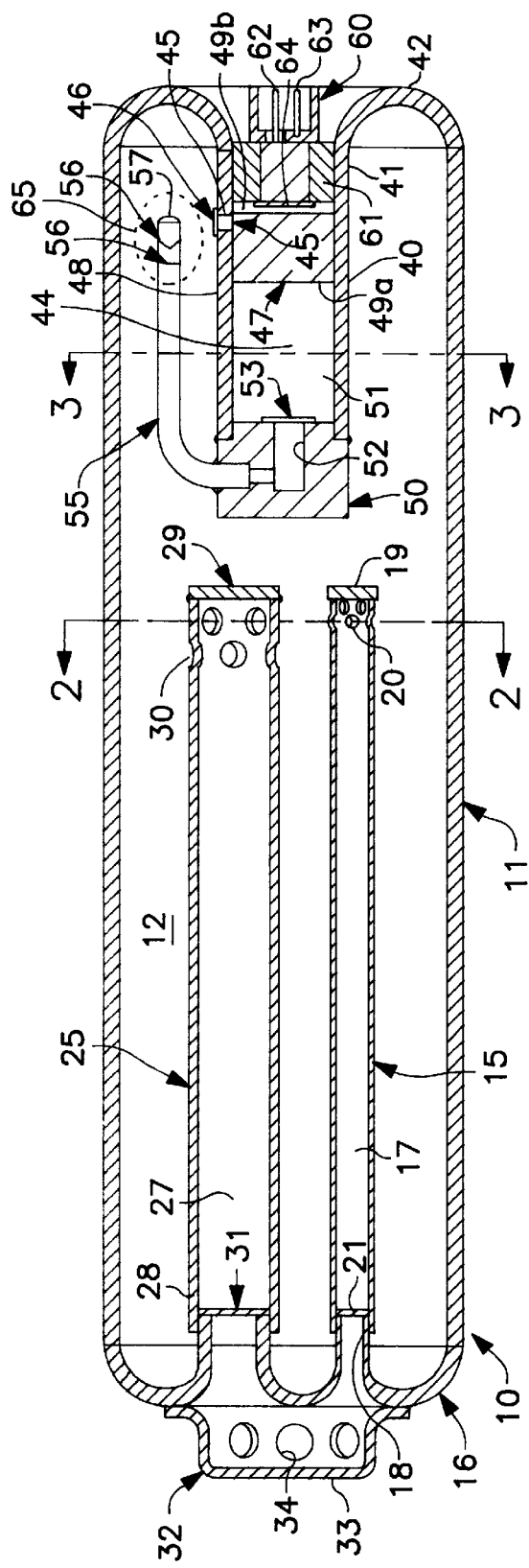
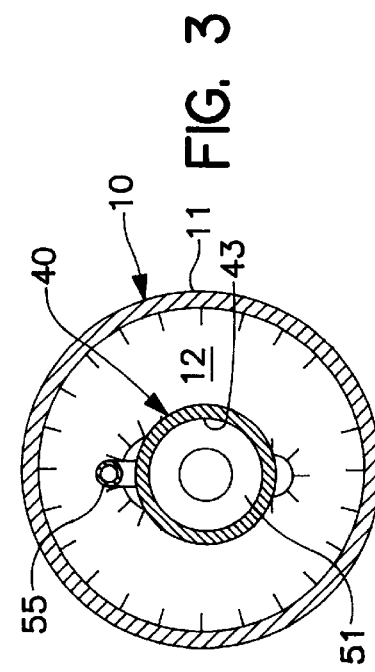
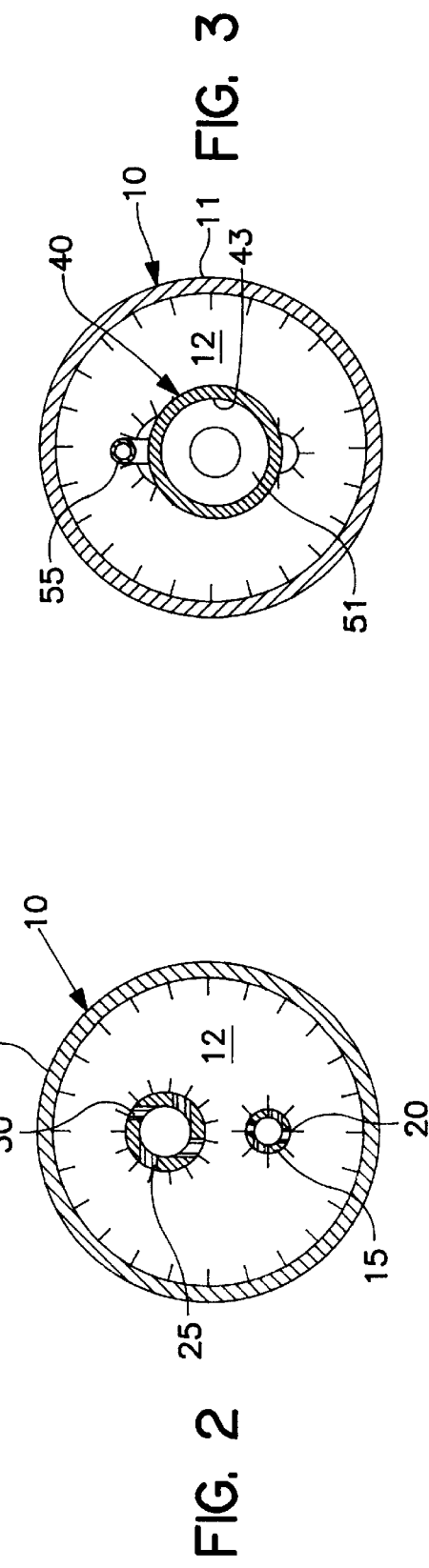

INFLATOR FOR VEHICLE AIR BAGS

CROSS-REFERENCE TO CO-PENDING PATENT APPLICATION

This is a continuation-in-part of applicants' U.S. patent application Ser. No. 08/664,408, filed Jun. 17, 1996, now abandoned.

FIELD OF THE INVENTION

An inflator for providing a quick burst of gas under pressure to an air bag.

BACKGROUND OF THE INVENTION

Air bags for protection of occupants of vehicles require that a substantial volume of gas quickly be delivered under pressure. There are numerous design constraints, among them being the small spaces available for storage of the inflator, often in the hub of a steering wheel, or in a door panel. In order to generate a sufficient volume of gas from a suitably small source, solid propellant materials are frequently utilized.

Such materials, while capable of generating the necessary volume of gas, involve many problems of their own. In manufacture they are hazardous, and the device must be assembled in conditions which arise to the standards of toxic propellant loading. After installation, these materials remain as an unseen risk to dismantlers, because they are hazardous materials. In the event of a vehicle fire, there is the risk of an unexpected the event of a vehicle fire, there is the risk of an unexpected explosion. Furthermore, they often generate undesirable gaseous products. Other constraints are that the output gases should not be in a condition to harm the bag itself. Compliance with these constraints is often attained at the cost of undesirable complexity.

It is an object of this invention to provide a gas source which consists only of benign "green" reactants, which if they leak are harmless to the environment or to nearby persons, and which will not autoignite. The gases produced by them are benign.

It is another object of this invention to provide a gas source whose output is not harmful to the bag itself, such as from particulates or from excessively hot inflation gases.

Because the air bag must be fully inflated within a few milliseconds, it could be presumed that a very steep rise in pressure is desirable. Such is not the actual situation. An air bag is multipli-folded and very tightly packed in order to be stored in a small volume. Too sudden a burst of gas might simply shoot the folded bag at the passenger. What is required is a rather slow initial pressure rise to allow the bag to begin to unfold, followed by a more rapid rise in pressure to inflate the bag quickly. The total event will still take only a few milliseconds, but there is assurance that the bag will unfold correctly.

As the art of air bags has developed, it has become increasingly evident that different inflation rates to different inflated pressures are desirable. For example, a small child who is belted in requires a less stressful restraint than a heavy passenger who is not belted in. The rate of increase of pressure to a desired maximum pressure, and the maximum pressure itself can advantageously be made very different.

Such variability cannot be attained with the use of solid propellant martials. Such materials are one shot, and develop gases according to their own stoichiometry. It is possible to throttle or by-pass some of the generated gases, but these techniques require specialized controls. Because air bags are generally designed for a 20 year installation life, any complexity is undesirable.

The use of a liquid propellant to drive the inflator offers, in addition to the advantages already discussed, means to vary the output rates and pressures which can be as simple as providing a plurality of igniters, which can be initiated (if at all) at different times, a plurality of exit orifice configurations which will be selectively opened, and means to vary the rate of flow of fuel to the oxidizer. All of these are readily established by sensors which are responsive, for example, to whether a seat is occupied, whether the occupant is belted, and how much the occupant weighs.

Accordingly, an air bag need not be deployed into an empty, seat, and a child need not face the same vigorous restraint as a heavy adult.

It is therefore an object of this invention to provide an air bag inflator which utilizes "green" constituents, and enables all or any of the above additional advantages to be attained.

BRIEF DESCRIPTION OF THE INVENTION

The inflator of this invention preferably utilizes a charge comprising an alcohol, preferably ethyl alcohol as a fuel, and oxygen gas as an oxidizer. Absolute alcohol (200 proof) is the preferred concentration, or nearly absolute with only a few percent of water, which often cannot readily be avoided during assembly of the device, absolute alcohol being a powerful desiccating agent.

Oxygen is provided under pressure so as to reduce the size of the gas source and still supply sufficient gas for the reaction. Important variations in the combustion rate and in the temperature of the output gas can be arranged by diluting the oxygen with a gas which takes no part in the reaction. An inert gas such as Argon is preferred, because of its high specific heat.

At proper temperatures and pressures, the gases of combustion will almost entirely be carbon dioxide and water. These are safe gases. When the bag is vented, the passenger will not be subjected to dangerous compounds.

A pyrotechnic igniter is provided for two purposes: as an injector to inject the fuel into the oxidizer, and to provide a flame that starts the combustion. Combustion will not start without a flame, but once it is started, it is self-sustaining.

The inflator includes a casing with a chamber which will hold the oxidizer gas at an elevated pressure. An exit port through the casing is closed by a burst disk which will be ruptured by the higher pressure gases developed after ignition. An exit tube extends into the chamber from the exit port to provide an orderly path for the generated gases to leave the chamber. The exit tube has an entry port spaced from the chamber exit port.

A fuel cell for holding the fuel has a discharge port opening into the chamber. A piston in the cell is driven by gases from the igniter to drive the fuel into the chamber. An igniter channel interconnects a region containing hot gases from the igniter to a region on the chamber adjacent to where the fuel and oxygen are mixed together in order to ignite them.

According to a feature of this invention, an injector tube conveys fuel from the discharge end of the fuel cell to an injector port adjacent to the igniter channel. The injector port is substantially spaced from the entry port of the exit tube.

According to an optional feature of this invention, the entry port to the exit tube is directed tangentially so as to produce a swirling flow of gas as it flows to the exit port.

According to other optional features of this invention, a plurality of individually actuable igniters may be provided to establish different rates of flow of fuel to the oxidizer.

According to yet another optional feature of this invention, a plurality of injector tubes may be provided which can be opened at appropriate times to establish the different rates of flow of duel to the oxidizer.

According to still another optional feature of the invention, a plurality of exit port configurations can be provided which open at different times, and which can deliver gases at different flow rates.

The above and other features of this invention will be fully understood from the following detailed description and the accompanying drawings, in which:

BRIEF DESCRIPTION OF THE DRAWINGS

FIG. 1 is an axial cross-section showing the presently-preferred embodiment of the invention;

FIG. 2 is a cross-section taken at line 2—2 in FIG. 1;

FIG. 3 is a cross-section taken at line 3—3 in FIG. 1;

DETAILED DESCRIPTION OF THE INVENTION

Figure 4:
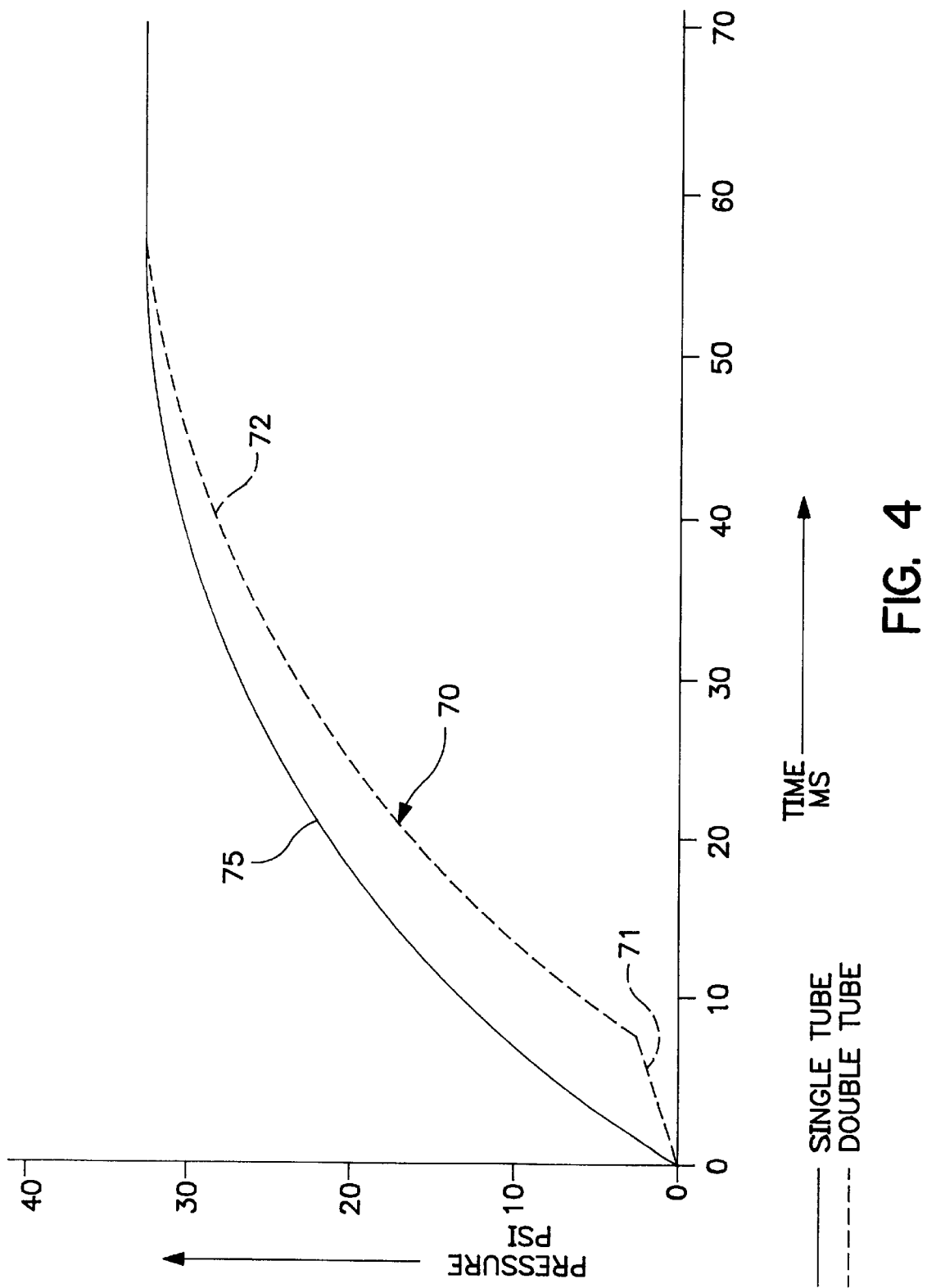
FIG. 4 is a graph which schematically shown the two-stage pressure rise in the output from two styles of the inflator, shown in FIGS. 1–3 as measured in a conventional test chamber.

An inflator 10 according to one embodiment of this invention comprises a rigid cylindrical casing 11 forming an inner gas chamber 12 for storage of the oxidant. This casing is to contain gas under pressure, usually between about 1,000 psi and about 2,500 psi. It must test to higher pressures to be commercially acceptably, because the pressure after ignition will rise higher.

A first exit tube 15 is welded to the inside end wall 16 of the casing. This exit passage 17 opens to a first exit port 18 through wall 16. A solid end closure 19 closes the end of the exit tube spaced from wall 16.

A plurality of entry ports 20 are formed through the wall of the exit tube, near end closure 19. These are well-spaced from wall 16. Preferably they enter tangentially into the exit passage so as to cause a swirling flow toward the exit port, thereby lengthening the flow path of the exiting gases.

A first burst disk 21 closes exit port 18. It is proportioned to burst at a first, lower generated pressure to open port 18 for flow of exiting inflation gas.

A second exit tube 25 is also welded to inside end wall 16 of the casing. Its exit passage 27 opens to a second exit port 28 through wall 16. A solid end closure 29 closes the end of the exit tube, spaced from wall 16.

A plurality of entry ports 30 are formed through the wall of the second exit tube. These are well-spaced from wall 16. Preferably they extend tangentially into the exit passage so as to cause a swirling flow toward the exit port, thereby lengthening the flow path of the exiting gas.

A second burst disk 31 closes exit port 28. It is proportioned to burst at a second, higher generated pressure to open port 28 for flow of exiting inflation gases.

A diverter 32 is welded to the outside of the casing, surrounding the exit ports. It is cup-shaped, having a closed end wall 33 and a plurality of discharge ports 34. These ports direct the gas in directions which minimize or eliminate net thrust from or on the inflator. The gases then flow to an air bag (not shown). This diverter also prevents a strong gas stream from directly impinging on an air bag with an undesirable jet force that might simply shoot the uninflated bag at the occupant.

A gas fill tube (not shown) may be included in the casing wall to facilitate loading of gas under pressure. After filling, it may be crimped or welded shut. There are, of course, other means for filling the chamber, which need no detailed description here.

A fuel cell 40 is generally cylindrical, and is conveniently formed as the continuation of a neck 41 in end wall 42. Fuel cell 40 includes an internal cylinder 43 having a central axis 44. An igniter channel 45 is formed through wall 42. It may be closed by a cover 46, plug, or burst disk, applied to the outside of the cylinder which will rupture upon ignition.

A piston 47 is slidably fitted in the cylinder with a close fit. It need not be an absolutely leak-proof fit. However, it should not permit excessive blow-by, for reasons which will become apparent. If desired, ring seals could be provided, but it is as well to rely instead on a close fit to avoid shelf-life problems. The piston includes a sidewall 48 of substantial length which, when the piston is in its rest condition as shown in FIG. 1, covers the opening of the igniter channel. This close fit may be a sufficient closure of the igniter channel, without cover 46. This spatial relationship is optional. When used, the igniter channel will be opened after sufficient movement of the piston. The piston has a pair of opposite faces 49a, 49b, one exposed to the fuel and the other to the igniter.

An end cap 50 is attached to the cylinder. A fuel chamber 51 for storage of fuel is formed inside the cylinder, between the piston and the end cap.

A fuel exit port 52 in end cap 50 opens into fuel chamber 51. It is closed by a burst disk 53.

An injector tube 55 taps into exit port 52, and extends as a conduit toward end wall 42. Injector ports 56 are preferably slit shaped. At least one should be directed toward igniter channel 45. A closure 57 closes the end of the injector tube. If desired, a cover can cover the injector ports 56 to be ruptured when the fuel is driven against it.

An igniter 60 is fitted into neck 41, and makes a strong fluid-tight fit with it. Thus it is able to resist expulsion by any pressure likely to be exerted on it. The igniter includes a solid gas generating charge 61, generally a propellant, adapted to be initiated such as by electrical current applied to terminals 62, 63.

A burst disk 64 covers the charge and protects it from the contents of the inflator. When the charge is ignited, such as by a current applied from a source upon impact, the generated gases will burst the disk 64 and drive the piston to the left in FIG. 1.

The charge may be any desirable pyrotechnic charge such as boron potassium nitrate (BKNO3), together with an initiator charge such as zirconium potassium perchlorate (ZPP). Its necessary characteristic is to generate sufficient gas under pressure to drive the piston and expel the fuel from the fuel chamber, and also to provide flaming gas through the igniter channel to discharge this flame into the inner chamber where the fuel and the pressurized gas will meet, in the example at region 65 around the slits in the injector tube. This starts the reaction of the fuel and oxidizer, which will continue even after no more flame from the igniter passes through igniter channel 45.

Although this reaction of fuel and oxidizer must be very rapid in order quickly to provide the necessary volume and pressure, it must be a controlled and not an explosive reaction. In order for it to be controlled, the rate of injection of fuel into the oxygen must be regulated, and there must be a sufficient path for combustion such that by the time the inflation gases of combustion leave the exit ports the fuel content is substantially combusted. The rate of injection is regulated by the rate of movement of the piston, because movement of the piston is the means to supply fuel for the generation of inflation gases.

Igniter channel means 45 comprises ports through the side of the fuel cell which open into the fuel cell between the driving face of the piston and the igniter. They are open to the gas chamber, but they are isolated from the fuel, and from the igniter by the sidewall of the piston until the igniter 60 ruptures disk 64 and the piston moves.

If preferred, disk 64 can be eliminated, and the piston and igniter body can be made as a unitary piece with a breakaway portion between them which will fracture and release the piston when the igniter is fired.

A casing 180 similar to casing 11 encloses a gas chamber 181, as in FIG. 1. Instead of two necks, only a single neck 182 is provided, to which a single exit tube 183 is connected. This tube extends to an entry end (not shown), identical to that shown on exit tube 25.

Instead of only one exit port, a closure plate 185 has two exit ports 186, 187, each closed by a respective burst disk 188, 189. The size of the exit ports and the strength of the disks are proportioned so that one bursts before the other, as in disks 21 and 31. A deflector 190 deflects the stream as in FIG. 1.

Figure 9:
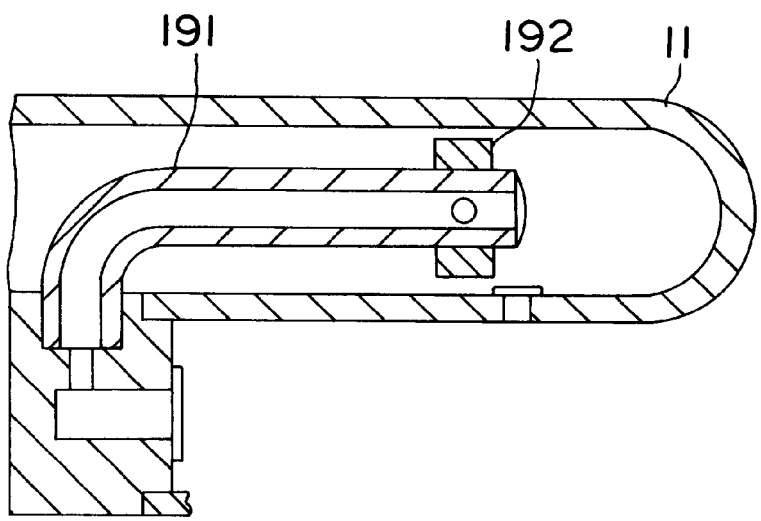
FIG. 9 is a fragmentary axial cross-section showing an additional feature.

FIG. 9 shows an injector tube 191 identical to injector tube 55, except hat it includes cover 192 that is applied as a band which bursts to pass fuel that is displaced by the piston. Meanwhile it separate the fuel from the oxygen.

Alcohols of four or fewer carbon atoms are suitable fuels. Suitable alcohols are methyl, ethyl, iso-propyl, propyl and butyl, and mixtures thereof. An objective in the choice of these alcohols is to select those with the least toxicity in themselves, and in their products of combustion. For this reason ethyl alcohol is preferred. Methyl, propyl, iso-propyl alcohol and butyl alcohol and mixtures thereof are useful, but are not as attractive as ethyl alcohol for the above reasons. Some water may intentionally be included in the fuel, but usually will not be. This fuel is charged into fuel chamber 51.

The preferred oxidizer is oxygen gas. Often it will be desired to include up to about 70% of the total gas charge with an inert gas such as Argon. Inclusion of an inert gas, particularly Argon, can result in variations of burning rates and output temperatures, depending on the proportion of inert gas in the charge. It is also useful because when it is used then there will be less uncombusted oxygen in the system after inflation is completed. While nitrogen can be used as a diluent gas, it is not preferred because of the possible formation of undesirable nitrogen oxides and other suitable combustion products what might be produced when the inflator is actuated.

The operation of this inflator is straight forward. Its loaded and ready condition is shown in FIG. 1. When the igniter is fired it will generate a volume of gas that will burst disk 64 and drive the piston to the left in FIG. 1, into the fuel cell.

Shortly after firing, the piston will have uncovered igniter channel 45, and cover 46 (if used) will rupture, permitting igniter flame to be directed into region 62, toward slits 56 in the injector tube. Also by this time, pressure in the fuel cell will have been raised by the piston above the pressure to which it is exposed. Then the fuel will have ruptured burst disk 53, and the fuel will have reached the slits, rupturing any cover over them, if any is used. The fuel will mix with the oxidizer in region 62 where the flame from the igniter channel is directed. This will ignite the fuel/oxidizer mixture. This action is self-sustaining. The piston finally strikes end cap 50, by which time all of the fuel in the fuel chamber will have expelled into the injector tube.

A stoichiometric excess of oxygen is provided. By this means combustion of all of the fuel is assured, and there will be minimal residual oxygen in the system which constitutes no risk.

When a two-step rise in pressure is desired as proposed in FIG. 1, first disk 21 is designed to rupture at a lower pressure than second disk 31. This will enable an initial lower pressure burst of gas to leave the inflator and enter the air bag, thus permitting the bag a few instants to begin to open.

Then as the pressure continues to rise in the chamber, the second burst disk will rupture, and full flow of gases results. It is necessary and particularly important in the optimal operation to proportion the two exit ports so that despite the continuing gas flow through the first exit port, pressure can still build up in the chamber sufficiently to rupture second disk 31 and continue to supply inflation gas to the necessary pressure and flow rates.

FIG. 4 is a graph 70 which shows pressure as a function of time. Segment 71 is the consequence of the opening of the first exit port. Segment 72 is the consequence of both exit ports being open, with the reaction in full process.

The two step operation can also be provided with the two burst disks which rupture at different pressures, but with only one common exit tube, with appropriate adjustments to their properties and proportions.

By way of explanation, FIG. 4 shows the pressure rise in a rigid test tank in which the inflator is either contained, or into which it discharges its inflation gases. The ordinate is gauge pressure, and the abscissa is the time scale. This is a conventional industrial technique to measure the performance of inflators for air bags. This same type of performance can be attained with the use of two burst disks, contained within a single exit tube. Generally one tube for each burst disk will be preferred, so that each can best respond to the flow conditions in a respective exit tube.

Graph 75 shows the results of providing only one burst disk and one exit tube. This does not provide the two-step advantage, but for some installations the larger volume, faster rise single pulse action is not only useful but preferred. Such a construction falls within the scope of this invention.

A suitable set of dimensions to provide the above advantages, with respect to FIG. 1, are as follows:

Length of chamber 12: 10.0 inches

Diameter of chamber 12: 2.4 inches

Length of the exit tubes: 4.0 inches

Inside diameter of exit tube 15: 0.43 inches

Inside diameter of exit tube 25: 0.56 inches

Inside diameter of cylinder 43: 0.43 inches

Length of piston stroke: 1.5 inches

For all of its simple construction, the regulation of the rate of fuel injection is rather complicated. Essentially it is a function of the instantaneous forces exerted on the opposite faces of the piston. These include the diminishing pressure from the igniter due to the movement of the piston away from it, and the leakage through the igniter channel on one face, and resistive forces from the pressure in the gas chamber, and the dynamic forces caused by resistance in the slits and in the injector tube on the other face.

Simplistically stated, the igniter gases will start the piston in motion. If the igniter channel is open to these gases before the piston moves, the cover if used will blow off. Preferably the igniter channel will remain closed by the piston until the piston has moved to uncover it. This permits the injection of some fuel into the chamber before the igniter flame arrives. Of course the burst disk will have ruptured to permit the flow fuel in either circumstance.

There results, in a very brief span of time, perhaps 20 milliseconds, a varying rate of piston movement which regulates the rate of injection of fuel into the gas chamber, and thus the rise rate of the gas pressure sent to the air bag.

Judicious selection of dimensions, and of the type and amount of ignition material used, enables one to build an inflator with either one or two exit tubes to provide interesting variations in rates. Of course, a sufficient igniter charge must be provided so that the piston does not become stalled by reverse pressure from the gas chamber. Such a result can occur if an insufficient charge is used.

The shape of the injector ports can be selected to provide a dispersed discharge of the liquid, to enable a better mixing with the oxidizer. Small straight thin slits have proved to be optimal. As many as 10 of them may be provided, which are directed in various directions around the injector tube with one preferably directed toward the injector port.

This simple and rugged inflator provides for a surprisingly broad selection of output pressures, temperatures, and rates of pressure raised. The relationship between chamber pressures, both stored and generated, and the driving pressure on the piston, allow for selection of the rate of fuel combustion.

The relative placement of the exit ports from the injector tube, the entry ports to the exit tubes, and the portion of the gas chamber from the base of the exit tubes to their entry ports is of considerable importance to this invention. As can be seen in FIG. 1, combustion of the fuel will begin around the end of the injector tube. There will, of course, be substantial oxygen in that region.

Then the combusted gases must flow to the entry ports of the exit tubes. As they do, they flow past the circular regions surrounding the ends of the exit tubes, a source of oxygen to complete the combustion. This is a significant advantage in assuring the completion of combustion of the fuel.

The reactants are in themselves benign, as are the products of combustion.

Figure 5:
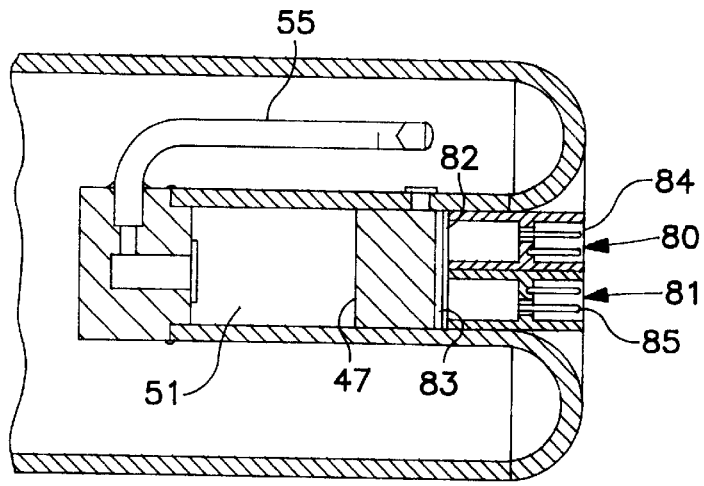
FIG. 5 is an axial cross-section of another embodiment of this invention.
Figure 6:
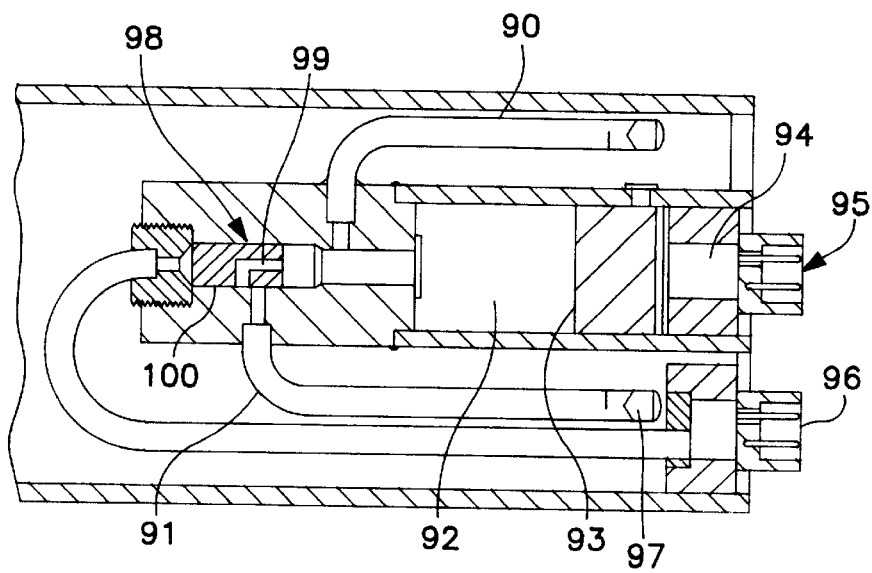
FIG. 6 is an axial cross-section of yet another embodiment of this invention.
Figure 7:
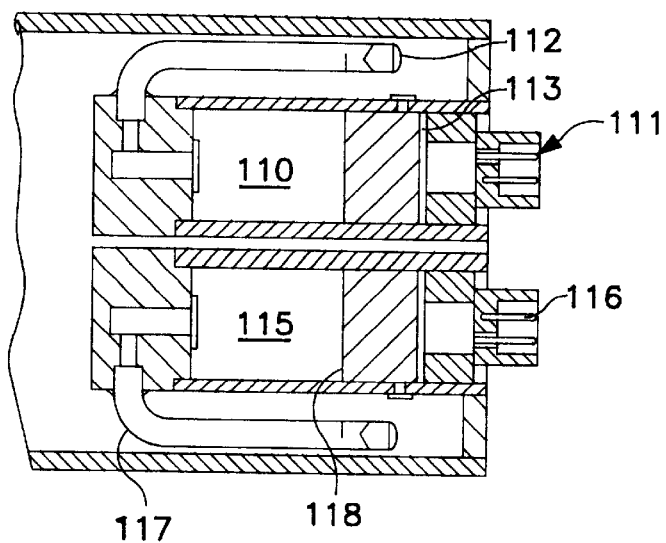
FIG. 7 is an axial cross-section of still another embodiment of this invention.
Figure 8:
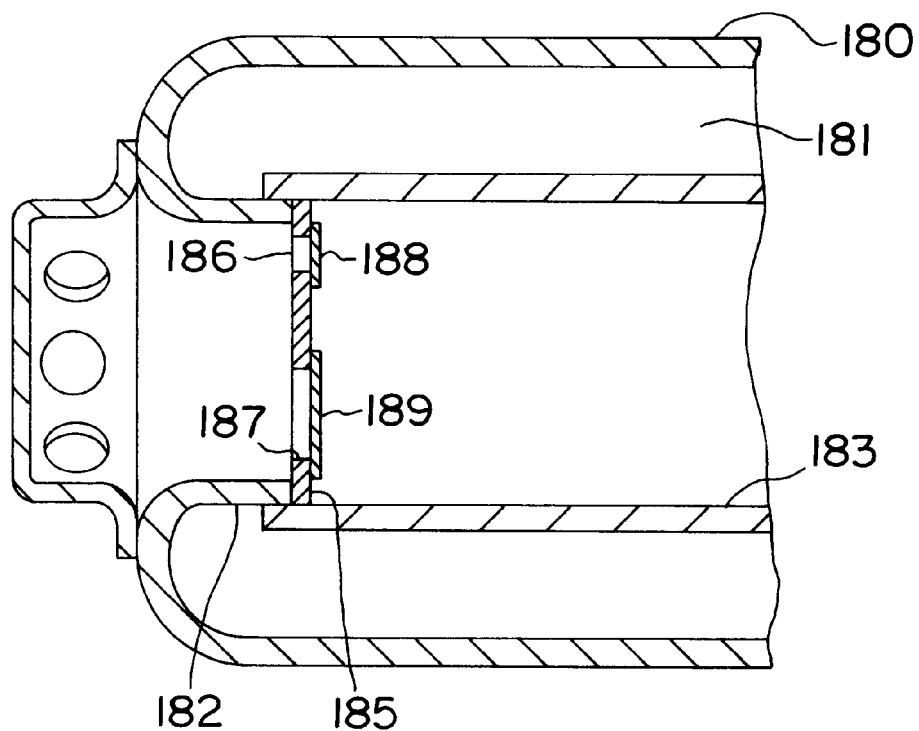
FIG. 8 is a fragmentary axial cross-section showing another embodiment of the invention.

The foregoing description of the embodiments of FIGS. 1–3 of their operation, is entirely applicable to the embodiments of FIGS. 5, 6, and 7, and will not be repeated again except as specifically necessary. However, their different configurations do result in important differences in the output of these structures. Because they differ only in the means to supply fuel to the oxidizer, only that end of the inflator is shown in these Figs, the exit tube or tubes, and the casing being identical.

FIG. 5 is identical in all of its details to FIG. 1, except for its igniter arrangement. Identical numbers will be used for identical parts. Instead of utilizing only one igniter, the embodiment of FIG. 5 utilizes two igniters 80, 81, each similar to igniter 60, and being closed by respective optional covers 82, 83. Their circuit connections 84, 85 will be connected to separate circuitry for ignition purposes.

For example, if a full size passenger with no seat belt confronts the air bag, then both of the initiators will be fired at once to produce the strongest, highest flow rate. If instead there is a small size unbelted passenger, or a standard passenger with a belt, then one initiator will first be fired, and after a delay established by the circuitry, the other will be fired. Notice that the initial flow rate established by the speed of movement of the piston is slower at first than if both were fired, and after the second initiator is fired, the rate will be slower than it would have been had they both been fired at once.

If the seat is occupied by a child, only the first initiator will be fired. Of course if there is no passenger, the circuitry will assure that the bag will not be fired at all. This is a considerable economy.

A substantial range of inflation gas rates is thereby provided merely by selecting the number of initiators to be fired, and if more than one, whether there should be a delay between them.

In FIG. 5 there is only one injector tube. Another way to obtain a variation in output rate is shown in FIG. 6, where there are provided two injector tubes 90, 91, both adapted to be connected to the same fuel chamber 92. Piston 93 is moved by firing charge 94 to expel fuel from the fuel chamber by firing initiator 95.

A second initiator 96 is provided, but it is never connected to the fuel chamber. It is used only for timing purposes, to determine when fuel is to be released through injector tube 91 in addition to injector tube 90. Injector tube 91 has openings 97 axially about even with those on injector tube 90. There need be no igniter passages facing openings 97, because the mixture will be combusting when fuel reaches them.

Timing is accomplished by a shuttle valve 98 whose rest position is shown in FIG. 6. It is shear-type valve, whose passage 99 is closed in the illustrated position.

When the second initiator is fired, its gases move shuttle 100 to the right in FIG. 6, and passage 99 then connects the second injector tube to the fuel chamber. By this means there are provided two exit paths for the fuel, and the reaction will accelerate.

The fired bag pressure should be about the same whether one or both injector tubes are open to flow. But if only one is initially open (tube 90) a slower inflation rate can be expected. The timing of opening the injector tube 91 can profoundly affect the rate of gas generation.

FIG. 7 shows another approach to varying the rate and extent of air bag inflation. Instead of only one fuel chamber 110 with its associated initiator 111, injector tube 112, and piston 113, it also has a second fuel charge 115, initiator 116, injector tube 117, and piston 118. The volumes of the fuel chambers may be made of such size as to accomplish a specific objective, and the size of the other is to supplement it, or perhaps not be used at all. This is a simple means to accommodate a wide variety of situations, because for the lightest passenger, perhaps only the smaller fuel chamber would be used. For a somewhat larger passenger, the larger could be used alone.

Then there are other combinations, including firing both at once, firing one or the other first, and then firing the other after some time interval which can readily be part of a signal to the later or those to be fired. This is a very versatile arrangement.

Without resorting to the use of components whose life-span may be questionable, this invention provides a wide range of inflation rates and pressures, primarily determined by the amount of fuel to be oxidized, and the rate at which it is supplied to the oxidizer. The use of multiple initiators enables sequential firing all while enjoying the benefits of a liquid propellant.

This invention is not to be limited by the embodiments shown in the drawings and described in the description, which are given by way of example and not of limitation, but only in accordance with the scope of the appended claims.

We claim:

1. An inflator for a vehicular air bag, comprising:
   a casing having an inside wall forming an inner chamber for storage of gas under pressure, said casing having an exit port from said inner chamber;
   a burst disk closing said exit port;
   an exit tube in said chamber, attached to said inner wall and surrounding said exit port, said exit tube having a central axis and a cylindrical axial flow passage extending into said chamber away from said exit port, said exit tube having an entry port spaced from said exit port by a length of said exit tube, said entry port entering through the wall of said tube, the end of said tube in said chamber being closed;
   a fuel cell having a wall forming an internal cylinder, said wall being attached to said casing;
   an end cap attached to said wall, closing said cylinder at one of its ends;
   a piston slidably fitted in said cylinder, said piston having a driving face and an opposite second face, said cylinder, end cap and second face forming a fuel chamber for storage of a liquid fuel, said piston having a sidewall of a given length;
   an igniter mounted in said casing wall, said igniter including gas generating means, and opening into said fuel cell in fluid communication with said driving face of said piston;
   an igniter channel passing through the cylinder wall, disposed to be open to the gases from the igniter after it is initiated, said igniter channel being directed into said gas chamber at a combustion region alongside the cylinder, said combustion region being spaced from said entry port adjacent said igniter, on the opposite side of the end cap from the exit tube;
   an injector tube entering said fuel chamber through said end cap, and extending to said combustion region, whereby to convey fuel expelled by the piston from said fuel chamber to said region, said injector tube including injector ports near said region;
   a liquid fuel in said fuel cell;
   an oxidizer gas in said gas chamber, said gas comprising oxygen under pressure; and
   separation means separating said fuel from said oxidizer gas until after said igniter has been initiated.

2. An inflator according to claim 1 in which a plurality of exit tubes is provided, each with a respective said burst disk, said burst disks being so proportioned as to rupture at different pressures, thereby to provide for a plurality of mass flow rates and hence a plurality of rates of pressure rise.

3. An inflator according to claim 1 in which said exit tube surrounds two exit ports and two burst disks, said burst disks being so proportioned as to rupture at different pressures, thereby to provide for a plurality of mass flow rates and hence a plurality of rates of pressure rise.

4. An inflator according to claim 1 in which said entry port in said exit tube enters the flow passage substantially tangentially, whereby gas flow into said flow passage is given a tangential component, and a swirling flow of gas to the exit port is created.

5. An inflator according to claim 1 in which said means separating said fuel from said oxidizer is a burst disk.

6. An inflator according to claim 1 in which said means separating said fuel from said oxidizer is a cover over said injector ports which ruptures by force exerted by the fuel on it after initiation of said igniter.

7. An inflator according to claim 1 in which said sidewall of said piston before initiation of the igniter covers the igniter channel, said igniter channel being opened after a predetermined movement of said piston, whereby timely presence of fuel in said combustion region is assured when gases from the igniter pass through said igniter chamber.

8. An inflator according to claim 1 in which said fuel comprises an alcohol selected from the group consisting of methyl, ethyl, iso-propyl, propyl, and butyl alcohols, and mixtures there of.

9. An inflator according to claim 8 in which said fuel comprises ethyl alcohol.

10. An inflator according to claim 1 in which said oxidizer gas includes an inert gas.

11. An inflator according to claim 10 in which said inert gas is Argon or Nitrogen or a mixture thereof.

12. An inflator according to claim 2 in which said entry port in said exit tube enters the flow passage substantially tangentially, whereby gas flow into said flow passage is given a tangential component and a swirling flow of gas to the exit port is created.

13. An inflator according to claim 2 in which said means separating said fuel from said oxidizer is a burst disk.

14. An inflator according to claim 2 in which said means separating said fuel from said oxidizer is a cover over said injector ports which ruptures by force exerted by the fuel on it after initiation of said igniter.

15. An inflator according to claim 2 in which said sidewall of said piston before initiation of the igniter covers the igniter channel, said igniter channel being opened after a predetermined movement of said piston, whereby timely presence of fuel in said combustion region is assured when gases from the igniter pass through said igniter channel.

16. An inflator according to claim 2 in which said fuel comprises an alcohol selected from the group consisting of methyl, ethyl, iso-propyl, propyl, and butyl alcohols, and mixtures there of.

17. An inflator according to claim 2 in which said oxidizer gas includes an inert gas.

18. An inflator according to claim 5 in which said entry port in said exit tube enters the flow passage substantially tangentially, whereby gas flow into said flow passage is given a tangential component whereby a swirling flow of gas to the exit port is created, and in which said sidewall of said piston before initiation of the igniter covers the igniter channel, said igniter channel being opened after a predetermined movement of said piston, whereby timely presence of fuel in said combustion region is assured when gases from the igniter pass through said igniter channel.

19. An inflator according to claim 17 in which said fuel comprises an alcohol selected from the group consisting of methyl, ethyl, iso-propyl, propyl, and butyl alcohols, and mixtures thereof.

20. An inflator according to claim 18 in which said oxidizer gas includes an inert gas.

21. An inflator according to claim 1 in which a plurality of igniters opens into said fuel cell in fluid communication with said second face of said piston, each said igniter being fired independently of the other.

22. An inflator according to claim 1 in which a second said injector tube enters said fuel chamber through said end cap and extends to said combustion region, a valve between said fuel chamber and said second injector tube normally closing said second injector tube, and second igniter means generates gas to be conveyed through a tube to said valve to open said second injector tube to flow upon the firing of said second igniter.

23. An inflator according to claim 1 in which a second fuel chamber, second piston, second igniter and second injector tube are provided, said first and second igniter being fired independently of one another.

24. An inflator according to claim 23 in which said first and second fuel chamber have a volume different from one another.

25. An inflator according to claim 21 in which a plurality of exit tubes is provided, each with a respective said burst disk, said burst disks being so proportioned as to rupture at different pressures, thereby to provide for a plurality of mass flow rates and hence a plurality of rates of pressure rise.

26. An inflator according to claim 22 in which a plurality of exit tubes is provided, each with a respective said burst disk, said burst disks being so proportioned as to rupture at different pressures, thereby to provide for a plurality of mass flow rates and hence a plurality of rates of pressure rise.

27. An inflator according to claim 23 in which a plurality of exit tubes is provided, each with a respective said burst disk, said burst disks being so proportioned as to rupture at different pressures, thereby to provide for a plurality of mass flow rates and hence a plurality of rates of pressure rise.

* * * * *